Figure 1:
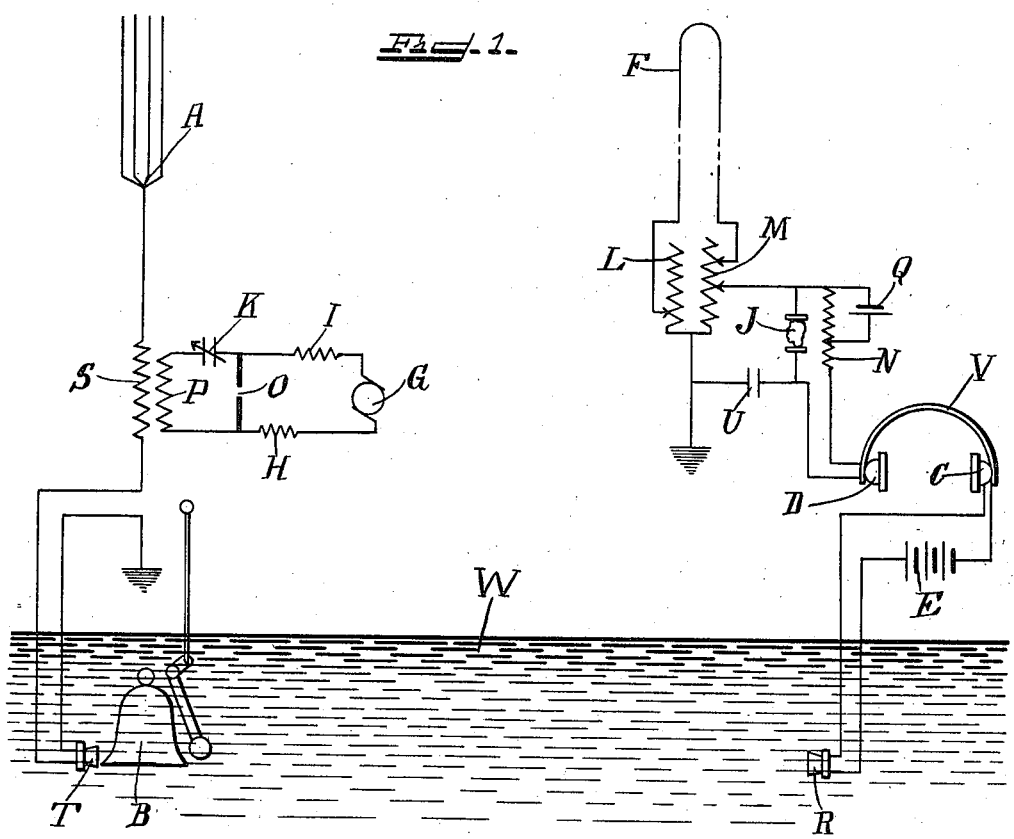

R. H. MARRIOTT.
SIGNALING SYSTEM.
APPLICATION FILED MAY 12, 1908.

913,528.

Patented Feb. 23, 1909.

Attest:
C. S. Ashley
C. A. Eagles

Inventor:
ROBERT H. MARRIOTT
by
Philip Farnsworth Atty

UNITED STATES PATENT OFFICE.

ROBERT H. MARRIOTT, OF BROOKLYN, NEW YORK.

SIGNALING SYSTEM.

No. 913,528.  Specification of Letters Patent.  Patented Feb. 23, 1909.

Application filed May 12, 1908. Serial No. 432,351.

*To all whom it may concern:*

Be it known that I, ROBERT H. MARRIOTT, a citizen of the United States of America, and a resident of the borough of Brooklyn, New York, have invented certain new and useful Improvements in Signaling Systems, the principles of which are set forth in the following specification and accompanying drawings, which disclose the form of the invention which I now consider to be the best of the various forms in which the principles of the invention may be embodied.

This invention relates to signaling systems useful for determining, first, the distances between two locations, such as a vessel and a shore-station, lighthouse or bell-buoy, or between two vessels, and also the direction of one with respect to another, particularly in the cases specified, where it may be desirable or important to speedily obtain accurate knowledge of such distance or direction, or both, where the same may be variable, and undeterminable by means alone either of waves of a ponderable medium, (water or air) as those of sound, or by means of the etheric medium, such as light or electric waves. The invention is extremely useful, not only in locating a vessel in distress, but in preventing accidents, and in permitting safe navigation under otherwise dangerous weather conditions.

The object of the invention is such a system, which is accurate and reliable in operation.

The invention consists of substantially the system hereinafter disclosed.

It has heretofore been proposed to emit at one place waves of sound simultaneously with the emission of a train or trains of electric waves constituting a telegraphic signal reproducible at a distant place, in order to permit the successive reception of the two kinds of signals at such place, (which, although distant, is yet within receptive distance of the sound waves), whereby the time interval between the reception of the two kinds of signals, due to the great difference in the time of transmission thereof, would indicate the distance between the two places. It has been proposed to accomplish this result as by operating a sound-producing means and simultaneously closing a switch to cause the production of electric waves constituting an etherically transmissible telegraph signal. In accordance with the present invention the danger is obviated of confusing such wireless telegraph signal (transmitted for said purpose) with other like signals which may be either calls and parts of messages from other wireless telegraphy installations, or simply false signals caused by atmospheric electricity. (At a typical commercial station of the present time, various buzzing, humming and clucking sounds are received at almost any instant from seven a. m. to two a. m., that is for the greater part of each day.) In accordance with this invention also, the danger is obviated of confusion with the usual whistles, sirens and fog horns employed for their ordinary purpose. In order to be practicable, the received indications for the determination of distance and direction must be clearly distinguishable from foreign interference by other kinds of signals. In accordance with the present invention, also, the danger is obviated of the results, as in navigation, of having only a partial knowledge of the location of a distant point, such as merely its distance and not its direction.

I am aware also that it has been proposed to enable the making of an approximate estimate of distance by emitting an electric wave signal of decrescent amplitude, whereby the receiving operator would hear longer signals as the distance becomes less, and vice versa; but this method requires not only a calculation based on the knowledge of the relation between the distance and the duration of the received signals, but also a knowledge of the actual duration of emission of signals, which involves considerable uncertainty and impracticability, irrespective of the additional fact that the strength of received signals as observed in the receiving telephone, varies not only with the distance, but with several other variable conditions.

It has also been proposed to employ water as the ponderable medium for the transmission of sound waves for the purpose of determining the direction of one point, such as a lightship, etc., with respect to another point, such as a vessel. Such a system does not serve as a means for determining the distance between the two points, although it does provide means for determining approximate direction between points which could not, under all adverse conditions such as storms, fog or darkness, be placed in communication by way of the atmosphere by any of the usual sound-signaling means, or by way of the ether in the space occupied by either air or water by any of the usual light-signaling means.

It has also been proposed to transmit sound waves through water in coöperation with the transmission of electric waves constituting a telegraphic signal, to measure distances, but such a system does not provide against the danger of the confusion of such telegraphic signals with other wireless telegraphy signals and messages.

While it is true that the usual light-signaling means indicates direction (in cases where the condition of the transmitting medium is such as to permit the reception of signals), yet this does not indicate distance; and the usual sound-signaling means, even when directive means for emitting and receiving are employed, indicates neither distance nor direction except in the case of the water medium whereby direction is approximately indicated, but not distance.

In accordance with this invention, not only is there provided means for directly approximately estimating the location of a distant point, but also means for determining the exact location of the same.

Figure 2:
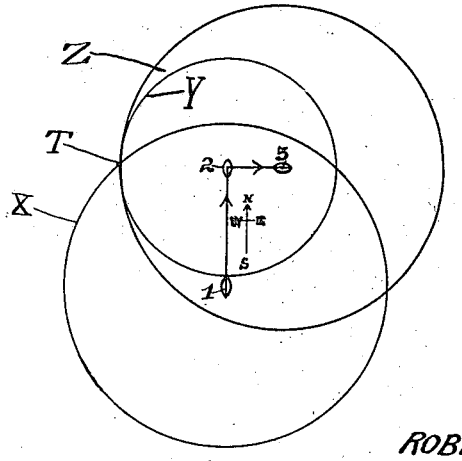

Of the drawings, Figure 1 is a diagrammatic illustration of a transmitting and a receiving installation (at the left and right respectively), said installations being located at two points distant from each other, as on a ship and at a shore station, or on two ships, each of which may of course be provided with both transmitting and receiving apparatus; and Fig. 2 is a diagrammatic illustration of a method of obtaining accurate knowledge, by means of the invention, of the direction and location of a distant point.

I have discovered that an ordinary metallic vibratory sound producing means such as a bell, which is the means usually employed for sub-marine signaling, and which is one of the few practical means for producing a comparatively pure or simple harmonic note, which is transmissible to a considerable distance, has extraordinary properties when employed, as a means for controlling the emission of electric waves in such way as to cause a reproduction at the wireless receiving installation so exact as to constitute a most reliable mode of reception through all foreign interference such as ordinary wireless telegraphy messages and false signals caused by atmospheric disturbances, which exact reproduction is so necessary in a system of the type of the present invention.

The action upon the controlling telephone transmitter and thence upon the electric wave source, and also the transmitting medium, by such a sound-producing means, is apparently functionally analogous to the action of the sound-producing means itself. This character of the product of such a sound-producing means is such that its translation into, and its translation in the form of electric ether wave energy, results in a clear reception, as an exact reproduction of all the characteristic aspects of its original form, and in cases where simultaneously transmitted electric waves modified by means of other kinds of sound-waves are not received at all. Furthermore, the undamped oscillations employed in wireless telephony permit much closer tuning than the damped oscillation of wireless telegraph, such that in this system everything but the effects of the transmitting bell can be tuned out as desired. In pursuance of this, the wireless telephone transmitter T, Fig. 1, is placed in the body of water W, which is common to that of the receiving installation, and in close operative proximity to the usual bell B as arranged for submarine signaling, also in the same body of water.

As is known to those skilled in the art, a receiving operator on a distant vessel provided with telephonic receiving devices located at different portions of the hull of the vessel, can thereby estimate the approximate direction of the bell-signaling installation. That expedient for direction finding is not required with this invention, although it may be employed if desired. Since the sound waves from the bell which are transmitted through the ponderable medium, (water in the case shown) are to operate not only the local wireless telephone transmitter T, but also another telephone transmitter R located in the same medium on the distant vessel, which may not be more than a few miles distant, the wireless telephone transmitter T should be so located with respect to the bell B that the extent of ponderable medium W between it and the bell will be so short as to be substantially negligible as compared with the distance between the bell and the distant telephone transmitter R at the receiving installation. The transmitters T and R may be of the ordinary carbon-button type, containing carbon granules and a coöperating diaphragm, as well known in the art. These transmitters are of course, in practice, together with their leads to the apparatus on the vessel, suitably insulated from the conductive and erosive action of the water, which will usually be salt. The wireless telephony apparatus controlled by the transmitter T may be of any suitable kind, as those known to those skilled in that art, and as shown by way of example.

In the case where the sound waves may be employed, pursuant to this invention, exclusively in the form of sound waves throughout their use and irrespective of electric waves, but in two different media, such as air and water, which transmits them at different velocities, the advantages of the invention are present, provided that the reproducible characteristics of the two sets of waves have such substantial correspondence as to cause the reproduction at the receiving installation of like sounds at successive times, so as to enable the receiving operator, by noting the resemblance, to differentiate both of them from all other kinds of signals which may be foreign to them. Such a case is diagrammatically represented in Fig. 1 where the entire wireless telephony transmitting apparatus on the vessel at the left may be considered to be representative of a bell like that in the water but located in air, and the wirless telephone transmitter in the water may be considered to be representative of a connection between the two bells adapted to permit their simultaneous operation.

At the receiving installation, the telephone transmitter R in the same body of water W, controls an ordinary telephone receiver C in circuit with it, and with a suitable source of e. m. f., as a battery E. For approximate location of direction, said transmitter R may coöperate in multiple with other similar transmitters, as in the submarine signaling art, located as fore and aft of a vessel, and on the port and starboard sides. A more accurate method of determining direction by the use of this invention is, however, disclosed hereinafter. The wireless telephone apparatus at the receiving installation at the right may be of any suitable kind, as those known to those skilled in the art, and as shown by way of example. It is also provided with a telephone receiver D, and this, with the receiver C operated by the transmitter R, may be mounted on a common head-piece V, whereby the receiving operator can readily listen, first with one ear, to the sound first occurring in receiver D, and then, with the other ear, to the like sound next occurring in receiver C. If desired however, the two receivers may be wound coöperatively, (as the two head telephones of such a set usually are in practice), in order that both instruments may act together for each of the two successive like signals, and to this end leads may be taken to the coöperating telephones from both sets of receiving apparatus. Any other suitable telephonic means may be employed in place of the telephone receivers, for noting the successive receipt of the electric waves and sound waves. The wireless apparatus at both the transmitting and receiving installations may if desired be that employed at the same installations for ordinary telephonic or telegraphic service, so that there need not be special apparatus of this kind to permit the present invention to be employed.

As shown, the wireless transmitting apparatus consists, for example, as at the left in Fig. 1, of an antenna conventionally represented at A, grounded through secondary inductance S and telephone transmitter T, whereby the sustained oscillations which may operatively be continuous in the antenna are varied in amplitude, form or frequency by the variations of the telephone diaphragm produced by the water-waves of sound from the bell B. The extent of the medium W between B and T is substantially negligible as compared with that between B and R, as indeed the mechanical vibrations of the sound - producing means may be caused to act directly on a resistance-varying contact to effect the same result. The transformer primary P is in operative relation to secondary S, and in circuit, as shown, with variable condenser K, inductances I and H, and generator G, the arc gap O being in shunt. At the receiving station as shown on the right in Fig. 1, the electrostatic loop antenna F is connected to the variable tuning inductances L and M, a lead being taken off inductance M, through the carborundum detector J and condenser U to the earth connection, and the local source of e. m. f. consisting of the battery Q and potentiometer N, being connected with the detector J and telephone receiver D.

For distance-determination the mere observation of the time-interval elapsing between the successive instants of reception of the sound by the two different means, is sufficient to instantly impart knowledge of the distance of transmission, the transmission of the ether-waves being substantially instantaneous and the velocity of the sound waves being comparatively very low and definitely known. For convenience in accurate operation, a stop watch may be calibrated to indicate the distance of sound-wave transmission per second, the watch to be started as soon as the first sound is heard and stopped at the instant of reception of the second sound.

The invention in addition to its function of permitting the speedy acquirement of accurate knowledge as to distance and approximate knowledge of direction, can be employed as hereinbefore suggested, to obtain accurate knowledge of direction by means of various methods, as follows: If knowledge of the distance between the inquiring installation has been obtained as by the use of the invention, and each of two installations the distance between which is known (as in the case of two shore stations), the exact direction of location of either of the latter with respect to the inquiring installation, can be readily obtained by triangulation, when, as would usually be the case, the general direction (port or starboard, etc.) of both such coast stations, would be known to the navigator of the inquiring vessel. In cases where the general direction of one foreign station, as a coast station, is known, two successive observations of the different distances separating it from the inquiring vessel, taken while the latter is in motion, will give the exact location, because the latter will be the known one of the two points of intersection of circles having the respective distances for their radii. In cases where absolutely no knowledge exists on the inquiring vessel, of the location of the other installation, which may be a vessel in distress, the method illustrated in Fig. 2 may be employed. Here the circle X has a radius representative of the determined distance of the inquiring vessel in its initial position indicated at 1, from the unknown installation, and the circle Y has the same with respect to the distance from the inquiring vessel's second position 2. The two points of intersection of these two circles indicate two possible locations of the point sought, which will be sufficient when it is known that the general direction of such point is toward one or the other of such intersections. But in the case of total lack of knowledge in question, above premised, the inquiring vessel may take a course toward either one of said intersecting points and then, at its third position 3, make a second observation with the stop-watch. The resulting third circle Z, the radius of which is the distance from the object sought (as in the cases of the two other circles) will cut one of the points, as T, of the intersection of circles X and Y, and this point T will represent the exact location of the object sought, in case the latter has not moved a substantial distance, such that the complete data thus obtained (including the distances and directions traversed by the vessel, as indicated by the log and compass,) readily permits a speedy estimate or calculation to be made, to obtain the definite knowledge sought. The method can likewise be employed to locate a distant vessel, even when the latter is in motion, as by drifting, by means of two observations with the stop-watch, in case the distant moving vessel has telephoned or telegraphed information of its course and speed.

The invention provides a simple, effective and practicable means for accomplishing the stated objects, and its characteristic feature of the transmission and reception of the same sound by way of different media at different velocities, insures a practical freedom from the confusing and dangerous effects of interference by other signals.

I claim:

1. In a system for the communication of intelligence by different forms of energy coöperatively, the combination with a bell at a transmitting installation and a telephone transmitter at a distant receiving installation, said bell and telephone transmitter being located in a common body of water, of a telephone transmitter located at the transmitting installation, in the same body of water aforesaid and at a sound-transmissible distance from said bell which is negligible as compared with the distance between said bell and said distant telephone transmitter; means located at the transmitting installation, and controlled by the telephone transmitter in the water thereat, for emitting electric waves having reproducible characteristics substantially corresponding with those of the sound waves emitted by the bell; means at the receiving installation for receiving electric waves; and telephonic means at the receiving installation for observing the receipt of the electric waves by their receiving means, and the succeeding receipt of the sound waves by the telephone transmitter in the water at the receiving installation.

2. In a system for the communication of intelligence by different forms of energy coöperatively, the combination with a vibratory metallic sound-producing means at a transmitting installation and a telephone transmitter at a distant receiving installation, said vibratory metallic sound-producing means and telephone transmitter being located in a common body of water; of a telephone transmitter located at the transmitting installation, in the same body of water aforesaid and at a sound-transmissible distance from said sound-producing means which is negligible as compared with the distance between the sound-producing means and said distant telephone transmitter; means located at the transmitting installation, and controlled by the telephone transmitter in the water thereat, for emitting electric waves having reproducible characteristics substantially corresponding with those of the sound waves emitted by the vibratory metallic sound producing means; means at the receiving installation for receiving electric waves, and telephonic means at the receiving installation for observing the receipt of the electric waves by their receiving means, and the succeeding receipt of the sound waves by the telephone transmitter in the water at the receiving installation.

3. In a system for the communication of intelligence by different forms of energy coöperatively, the combination with a sound-producing means at a transmitting installation and a telephone transmitter at a distant receiving installation, said sound-producing means and telephone transmitter being located in a common body of water; of a telephone transmitter located at the transmitting installation, in the same body of water aforesaid, and at a sound-transmissible distance from said sound-producing means which is negligible as compared with the distance between the sound-producing means and distant telephone transmitter; means located at the transmitting installation, and controlled by the telephone transmitter in the water thereat, for emitting electric waves having reproducible characteristics substantially corresponding with those of the sound waves emitted by the sound producing means; means at the receiving installation for receiving electric waves; and telephonic means at the receiving installation for observing the receipt of the electric waves by their receiving means, and the successive receipt of the sound waves by the telephone transmitter in the water at the receiving installation.

4. In a system for the communication of intelligence by different forms of energy coöperatively, the combination, at a transmitting installation, with a bell, of a telephone transmitter located in the same medium in which the bell is located and at a substantially negligible sound-transmissible distance from said bell, and means, controlled by said telephone transmitter, for emitting electric waves having reproducible characteristics substantially corresponding with those of the sound-waves emitted by said bell.

5. In a system for the communication of intelligence by different forms of energy coöperatively, the combination, at a transmitting installation, with a vibratory metallic sound-producing means, of a telephone transmitter located in the same medium in which the vibratory metallic sound-producing means is located and at a substantially negligible sound-transmissible distance from said sound-producing means, and means, controlled by said telephone transmitter, for emitting electric waves having reproducible characteristics substantially corresponding with those of the sound-waves emitted by said vibratory metallic sound-producing means.

6. In a system for the communication of intelligence by different forms of energy coöperatively, the combination, at a transmitting installation, with means for emitting a substantially pure sound transmissible to a considerable distance in the form of sound-waves, of a telephone transmitter located in the same medium in which the sound-emitting means is located and at a substantially negligible sound-transmissible distance from said sound-producing means; and means, controlled by said telephone transmitter, for emitting electric waves, having reproducible characteristics substantially corresponding with the waves from said sound-emitting means.

7. In a system for the communication of intelligence by different forms of energy coöperatively, the combination, at a transmitting installation, with means for emitting, substantially simultaneously, two different kinds of waves transmissible at different velocities, of means for causing one of the kinds of waves to control the operation of the emitting means for the other kind of waves.

8. In a system for the communication of intelligence by different forms of energy coöperatively, the combination with means for emitting electric waves, of means for emitting sound waves at desired times, and means, controlled by the sound-emitting means and located at a substantially negligible sound-transmissible distance therefrom, for varying the reproducible characteristics of the electric waves to establish a substantial correspondence thereof with those of the sound-waves.

9. A system for the communication of intelligence by different forms of energy coöperatively, which comprises means for causing the substantially simultaneous emission of different kinds of energy-waves transmissible at different velocities but having characteristics capable of reproduction as sounds, of substantial correspondence as to note.

10. In a system for communicating intelligence by different forms of energy coöperatively, the combination, at a transmitting installation, with means for producing sound-waves transmissible through a given medium to a considerable distance; of means for producing simultaneously, in a different medium, waves having characteristics capable of reproduction as sounds substantially corresponding in note with those of said sound waves in the first medium, said waves in the second medium being transmissible at a rate of speed different from that of the rate of transmission of the waves in the first medium.

11. In a system for the communication of intelligence by different forms of energy coöperatively, the combination, at a transmitting installation, with means for reproducing electric waves; of means for producing sound-waves; and means controlling the means for producing the electric waves and located at a substantially negligible sound-transmissible distance from the sound-producing means, whereby the reproducible characteristics of the electric waves are caused by the action of the sound waves on said controlling means to correspond substantially with those of the sound waves.

12. In a system for the observation from a movable object such as a vessel, of a distant point, the combination, in a receiving installation on the movable object, with means for receiving energy-waves transmitted at different velocities to the movable object, but emitted substantially simultaneously from the distant point, which waves so transmitted at different velocities, have substantially corresponding reproducible characteristics, said receiving means being adapted to receive such energy waves; of means operatively associated with said receiving means, for telephonically reproducing such characteristics so received, to permit the identification of the simultaneously emitted waves of different velocities successively received, and to permit successive observations of the varying time intervals between their successive reception at successive stages of the varying conditions of the movable object with which the receiving installation is incorporated.

13. In a signaling system, the combination, at a transmitting installation, with a bell located in a body of water and adapted for the propagation of sound waves through the water, of a telephone transmitter arranged in said body of water at a substantially negligible sound-transmissible distance from said bell; and an electric-wave transmitter controlled by said telephone transmitter to emit electric ether-waves having reproducible characteristics substantially corresponding with the sound waves of the bell.

14. In a system for the observation at one point of a distant object which may be movable, as a vessel, the combination, at the point of observation, with means for receiving energy-waves transmitted at different velocities to the receiving means, but emitted substantially simultaneously from the distant object, which waves so transmitted at different velocities, have characteristics capable of reproducing as sounds of substantial correspondence as to note, said receiving means being adapted to receive the waves of such velocities and characteristics; of means operatively associated with said receiving means, for telephonically reproducing such characteristics so received; to permit the identification of the simultaneously-emitted waves of different velocities successively received, and to permit successive observations of the varying time intervals between their respective reception at successive stages of the varying conditions of the movable distant object.

15. A system for the communication of intelligence by different forms of energy co-operatively, which comprises means for causing the substantially simultaneous emission of waves of electricity and sound having characteristics capable of reproduction of sounds of substantial correspondence as to note.

ROBERT H. MARRIOTT.

Witnesses:
JOHN C. L. O'REILLY,
PHILIP FARNSWORTH.